United States Patent [19]

Petty et al.

[11] Patent Number: 5,862,131
[45] Date of Patent: Jan. 19, 1999

[54] HYBRID TIME-SLOT AND SUB-TIME-SLOT OPERATION IN A TIME-DIVISION MULTIPLEXED SYSTEM

[75] Inventors: Norman W. Petty, Boulder; Michael A. Smith, Broomfield; Douglas A. Spencer, Boulder, all of Colo.

[73] Assignee: Lucent Technologies Inc., Murray Hill, N.J.

[21] Appl. No.: 728,814

[22] Filed: Oct. 10, 1996

[51] Int. Cl.[6] .............................. H04J 3/16; H04Q 11/04
[52] U.S. Cl. .......................... 370/362; 370/376; 370/518; 375/376
[58] Field of Search .................................. 370/357, 359, 370/360, 362, 363, 364, 375, 376, 377, 378, 379, 384, 385, 422, 423, 426, 458, 462, 463, 503, 516, 518; 375/373, 375, 376

[56] References Cited

U.S. PATENT DOCUMENTS

| | | | |
|---|---|---|---|
| 4,187,399 | 2/1980 | Maxfield et al. | 370/364 |
| 4,581,733 | 4/1986 | Sarson et al. | 370/426 |
| 4,628,446 | 12/1986 | Hoffner, II | 395/886 |
| 4,656,627 | 4/1987 | Hasley et al. | 370/438 |
| 4,791,629 | 12/1988 | Burns et al. | 370/363 |
| 4,965,884 | 10/1990 | Okura et al. | 375/354 |
| 5,311,576 | 5/1994 | Brunson et al. | 370/362 |
| 5,423,024 | 6/1995 | Cheung | 395/182.09 |
| 5,594,727 | 1/1997 | Kolbenson et al. | 370/468 |

*Primary Examiner*—Alpus H. Hsu
*Attorney, Agent, or Firm*—David Volejnicek

[57] ABSTRACT

A port circuit (108) for a time-division multiplexed (TDM) switching system (100) is designed to effect sub-time-slot operation without external support, as well as to effect conventional, time-slot operation. A clock-frequency multiplier, such as a frequency-multiplexed phase-lock loop (PLL 202), and a multiplier-driven sub-time-slot operation circuit, such as a PLL-driven finite state machine (203), are incorporated into the port circuit. The clock-frequency multiplier and the sub-time-slot operation circuit generate all the additional control signals that are necessary to define sub-time slots and to effect multiple information transfers in a single time slot. The port circuit engages in conventional time-slot transfers with conventional port circuits, whereby it is compatible therewith, and engages in sub-time-slot transfers with other sub-time-slot enabled port circuits, whereby it increases the transfer throughput of the TDM switching fabric. The sub-time-slot operation is selectively enabled and disabled on a per-time-slot basis.

12 Claims, 7 Drawing Sheets

FIG. 3A

| STATE | AR LINE 222 | BR LINE 224 | AW LINE 223 | BW LINE 225 | MUX A+B R/W LINE 226 | BUFA R/W LINE 216 | BUFB R/W LINE 217 |
|---|---|---|---|---|---|---|---|
| 0 | IF AREAD = R, THEN R | | | | | | |
| 1 | IF AREAD = R, THEN R | | | | IF AREAD = W, THEN W | | |
| 2 | IF AREAD = R, THEN R | | | | IF AREAD = R, THEN R | | |
| 3 | IF AREAD = R, THEN R | | IF AREAD = W, THEN W | | | | |
| 4 | | IF BREAD = R, THEN R | | | | | |
| 5 | | IF BREAD = R, THEN R | | | IF BREAD = W, THEN W | | |
| 6 | | IF BREAD = R, THEN R | | | IF BREAD = R, THEN R | | |
| 7 | | IF BREAD = R, THEN R | | IF BREAD W, THEN W | | | |

FIG. 3B

| STATE | AR LINE 222 | BR LINE 224 | AW LINE 223 | BW LINE 225 | MUX A+B R/W LINE 226 | BUFA R/W LINE 216 | BUFB R/W LINE 217 |
|---|---|---|---|---|---|---|---|
| ... | ... | ... | ... | ... | ... | ... | ... |
| 8 | IF AREAD = R, THEN R | | | | | | |
| 9 | IF AREAD = R, THEN R | | | | IF AREAD = W, THEN W | IF AREAD = W OR BREAD = W, THEN W | IF AREAD = W OR BREAD = W, THEN W |
| 10 | IF AREAD = R, THEN R | | | | IF AREAD = R, THEN R | | |
| 11 | IF AREAD = R, THEN R | IF BREAD = R, THEN R | IF AREAD = W, THEN W | | | | |
| 12 | | IF BREAD = R, THEN R | | | | | |
| 13 | | IF BREAD = R, THEN R | | | IF BREAD = W, THEN W | | |
| 14 | | IF BREAD = R, THEN R | | | IF BREAD = R, THEN R | R | R |
| ... | ... | ... | ... | ... | ... | ... | ... |

FIG. 3C

| STATE | AR LINE 222 | BR LINE 224 | AW LINE 223 | BW LINE 225 | MUX A+B R/W LINE 226 | BUFA R/W LINE 216 | BUFB R/W LINE 217 |
|---|---|---|---|---|---|---|---|
| ... | ... | ... | ... | ... | ... | ... | ... |
| 15 | | IF BREAD = R, THEN R | | IF TDMSUB B = YES AND BREAD = W, THEN W | | | |
| 16 | IF TDMSUB A = YES AND AREAD = R, THEN R | | | | | IF TDMSUB A = YES AND AREAD = W, THEN W | IF TDMSUB B = YES AND BREAD = W, THEN W |
| 17 | IF TDMSUB A = YES AND AREAD = R, THEN R | | | | IF TDMSUB A = YES AND AREAD = W, THEN W | | |
| 18 | IF TDMSUB A = YES AND AREAD = R, THEN R | | | | IF TDMSUB A = YES AND AREAD = R, THEN R | | |
| 19 | IF TDMSUB A = YES AND AREAD = R, THEN R | | IF TDMSUB A = YES AND AREAD = W, THEN W | | | | |
| 20 | | IF TDMSUB B = YES AND BREAD = R, THEN R | | | | | IF TDMSUB B = YES AND BREAD = W, THEN W |
| 21 | | IF TDMSUB B = YES AND BREAD = R, THEN R | | | IF TDMSUB B = YES AND BREAD = W, THEN W | IF TDMSUB A = YES AND AREAD = R, THEN R | |
| 22 | | IF TDMSUB B = YES AND BREAD = R, THEN R | | | IF TDMSUB B = YES AND BREAD = R, THEN R | | |
| ... | ... | ... | ... | ... | ... | ... | ... |

FIG. 3D

| STATE | AR LINE 222 | BR LINE 224 | AW LINE 223 | BW LINE 225 | MUX A+B R/W LINE 226 | BUFA R/W LINE 216 | BUFB R/W LINE 217 |
|---|---|---|---|---|---|---|---|
| ... | ... | ... | ... | ... | ... | ... | ... |
| 23 | | IF TDMSUB B = YES AND BREAD = R, THEN R | | IF TDMSUB B = YES AND BREAD = W, THEN W | | | |
| 24 | IF TDMSUB A = YES AND AREAD = R, THEN R | | | | | IF TDMSUB A = YES AND AREAD = W, THEN W | IF TDMSUB B = YES AND BREAD = W, THEN W |
| 25 | IF TDMSUB A = YES AND AREAD = R, THEN R | | | | IF TDMSUB A = YES AND AREAD = W, THEN W | | |
| 26 | IF TDMSUB A = YES AND AREAD = R, THEN R | | | | IF TDMSUB A = YES AND AREAD = R, THEN R | | |
| 27 | IF TDMSUB A = YES AND AREAD = R, THEN R | | IF TDMSUB A = YES AND AREAD = W, THEN W | | | | |
| 28 | | IF TDMSUB B = YES AND BREAD = R, THEN R | | | | | |
| 29 | | IF TDMSUB B = YES AND BREAD = R, THEN R | | | IF TDMSUB B = YES AND BREAD = W, THEN W | IF TDMSUB A = YES AND AREAD = R, THEN R | IF TDMSUB B = YES AND BREAD = R, THEN R |
| 30 | | IF TDMSUB B = YES AND BREAD = R, THEN R | | | IF TDMSUB B = YES AND BREAD = R, THEN R | | |
| 31 | | IF TDMSUB B = YES AND BREAD = R, THEN R | | | | WHEN EDGE = FALLING, R | WHEN EDGE = FALLING, R |

HYBRID TIME-SLOT AND SUB-TIME-SLOT OPERATION IN A TIME-DIVISION MULTIPLEXED SYSTEM

TECHNICAL FIELD

This invention relates generally to time-division multiplexed (TDM) systems, and specifically to TDM communications switching systems.

BACKGROUND OF THE INVENTION

Time-division multiplexing is commonly employed in the switching fabrics of modern communications switching systems. An illustrative example is the TDM bus of the Lucent Technologies Inc. Definity® private branch exchange (PBX). New applications and technology quickly exhaust the bus capacity of such existing TDM systems. For example, multimedia communications use large numbers of time slots per line-port or trunk-port, while new hardware technology allows ever-more ports to be implemented via each port circuit pack. It is therefore necessary to increase the bus capacity of the TDM systems.

One approach to increasing the TDM bus capacity runs the bus faster, that is, at a higher clock rate. This approach requires a new design for all circuit packs that connect to and use the TDM bus. This translates to large development and upgrade costs. Hence, this approach is suitable for use only in new system designs where compatibility with existing systems is not required.

A second approach to increasing the TDM bus capacity adds a higher-speed multi-phase clock distribution line to the existing TDM bus. This approach allows existing circuit packs to use the existing clock for conventional operation, and allows new circuit packs to use the new multiphase clock for sub-time-slot operation wherein multiple sub-time-slot transfers occur in a single time-slot. An illustrative example of such an approach is described in U.S. Pat. No. 4,656,627. This approach requires new bus backplanes and clock-generation circuitry, which makes upgrades of existing systems difficult and expensive. Therefore, what the art still lacks is a way to increase the bus capacity of TDM systems that is easily retrofitted into existing systems and does not interfere with the operation of, or require changes to, existing port circuit packs and bus backplanes.

SUMMARY OF THE INVENTION

This invention is directed to solving the disadvantages and meeting the needs of the prior art. According to the invention, a port circuit is designed to effect sub-time-slot operation without external support, as well as to effect conventional time-slot operation. Illustratively, a clock-frequency multiplier, such as a frequency-multiplied phase-lock loop (PLL), and a multiplier-driven sub-time-slot operation circuit, such as a PLL-driven finite state machine, are incorporated into new port circuit packs. The clock-frequency multiplier and the sub-time-slot operation circuit generate all the additional control signals that are necessary to effect multiple TDM bus transfers in a single time-slot. The sub-time-slot operation is enabled on a per-time-slot basis, which allows sub-time-slot operation to coexist with standard operation on the same TDM bus. It also allows the new port circuit packs to engage in standard time-slot operation with conventional port circuit packs. The new port circuit packs operate without interfering with, or requiring any changes to, existing port circuit packs and TDM bus backplanes. Therefore, retrofits into and upgrades of existing TDM systems are simple and relatively inexpensive to effect.

Generally according to one aspect of the invention, a switching system comprises a TDM switching fabric that defines a plurality of time slots each having a predetermined duration, a plurality of first (conventional) port circuits connected to the switching fabric and each for effecting only one information transfer through the switching fabric during any one time slot, and a plurality of second port circuits connected to the switching fabric and each defining a plurality of sub-time slots during each said time slot for selectively effecting either (a) only one information transfer through the switching fabric during any one time slot or (b) one information transfer through the switching fabric during any one sub-time slot so as to effect a plurality of information transfers through the switching fabric during a single time slot. Generally according to another aspect of the invention, a port circuit for a switching system that includes the above-characterized TDM switching fabric and plurality of first port circuits comprises an arrangement for defining a plurality of sub-time slots during each time slot, and an arrangement coupled to the sub-time-slot defining arrangement for selectively effecting either (a) only one information transfer through the switching fabric during any one time slot or (b) one information transfer through the switching fabric during any one sub-time slot so as to effect a plurality of information transfers through the switching fabric during a single time slot. The sub-time-slot enabled port circuit is thus advantageously capable of hybrid time-slot and sub-time-slot operation in the TDM switching system. The sub-time-slot enabled port circuit effects the single transfers through the switching fabric during single time slots with the first port circuits, whereby it is compatible with the first port circuits, and effects the single transfers through the switching fabric during single sub-time slots with other sub-time-slot enabled port circuits, whereby it increases the transfer throughput of the TDM switching fabric.

Advantageously, the switching system conveys first clock signals that define the time slots to all port circuits, and the sub-time-slot enabled port circuit multiplies the received first clock signals to generate therefrom second clock signals that define the sub-time slots. The sub-time-slot enabled port circuit thus effects sub-time slot operation without any support from the switching system other than the support which the switching system conventionally provides to conventional port circuits. Also advantageously, the sub-time-slot enabled port circuit includes an arrangement for synchronizing the plurality of sub-time-slots of a time slot with the time slot, thereby ensuring that the time boundaries of time slots are not violated by sub-time-slot transfers. Further advantageously, the sub-time-slot enabled port circuit uses a finite state machine to generate control signals for the sub-time-slot operation. The finite-state machine is a resource-efficient and relatively inexpensive implementation of a control mechanism. Preferably, the finite-state machine further implements the synchronizing arrangement, as a subset of its states, thereby eliminating the need for separate circuitry to implement this function.

These and other advantages and features of the invention will become more apparent from the following description of an illustrative embodiment of the invention taken together with the drawing.

BRIEF DESCRIPTION OF THE DRAWING

FIGS. 3A–3D are a state diagram of a finite-state machine of the port circuit of FIG. 2.

DETAILED DESCRIPTION

Figure 1:
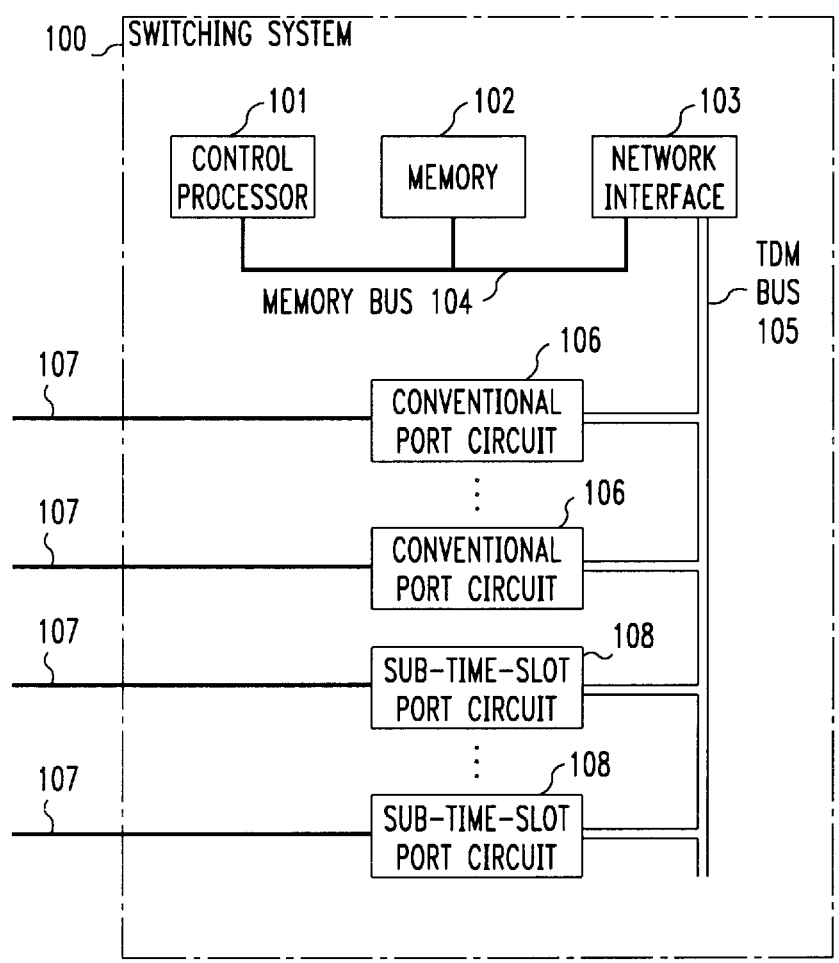
FIG. 1 is a block diagram of an illustrative TDM communications switching system.

FIG. 1 shows an illustrative TDM communications switching system 100 which incorporates an illustrative embodiment of the invention 108. Switching system 100 is illustratively the Lucent Technologies Inc. Definity® PBX. It comprises a control processor 101, a memory 102, and a network interface 103, interconnected by a memory bus 104. Network interface 103 provides processor 101 with access to a time-division multiplexed (TDM) bus 105, which serves as the communications switching medium—the switching fabric—of switching system 100. In the Definity PBX, TDM bus 105 comprises two TDM buses (A+B) operating in parallel and each having one-half the capacity (time slots) of TDM bus 105. Control processor 101 controls the operation of switching system 100 and performs telecommunications functions, including call processing and the assignment of time slots of TDM bus 105 for use by individual port circuits 106 and 108 which are connected to TDM bus 105. To perform its functions, processor 101 communicates with port circuits 106 and 108, and communication lines and trunks 107 that are connected thereto, via TDM bus 105. Port circuits 106 and 108 include conventional port circuits 106 and sub-time-slot port circuits 108. Sub-time-slot port circuits 108 are constructed according to principles of the invention.

A conventional port circuit 106 of the Definity PBX is connected and interfaced to TDM bus 105 by a sanity and control interface (SAKI), a switch conferencer for TDM bus and concentration highway (SCOTCH), and a pair of concentration highways. SAKI communicates control messages to and from control processor 101 over TDM bus 105. It converts standard system 100 control messages to and from the communications protocol of TDM bus 105. SAKI generates an interrupt upon receipt of a message from TDM bus 105, and accepts a message for output to TDM bus 105 in response to receipt of an interrupt. SCOTCH is a concentration/deconcentration device that connects multiple voice and/or data communication channels between the concentration highways and TDM bus 105. SCOTCH receives multiple channels for concentration via a first concentration highway, and outputs deconcentrated channels onto a second concentration highway. Each concentration highway is a conventional passive serial TDM bus that accommodates up to 64 channels in each repetitive frame.

Figure 2:
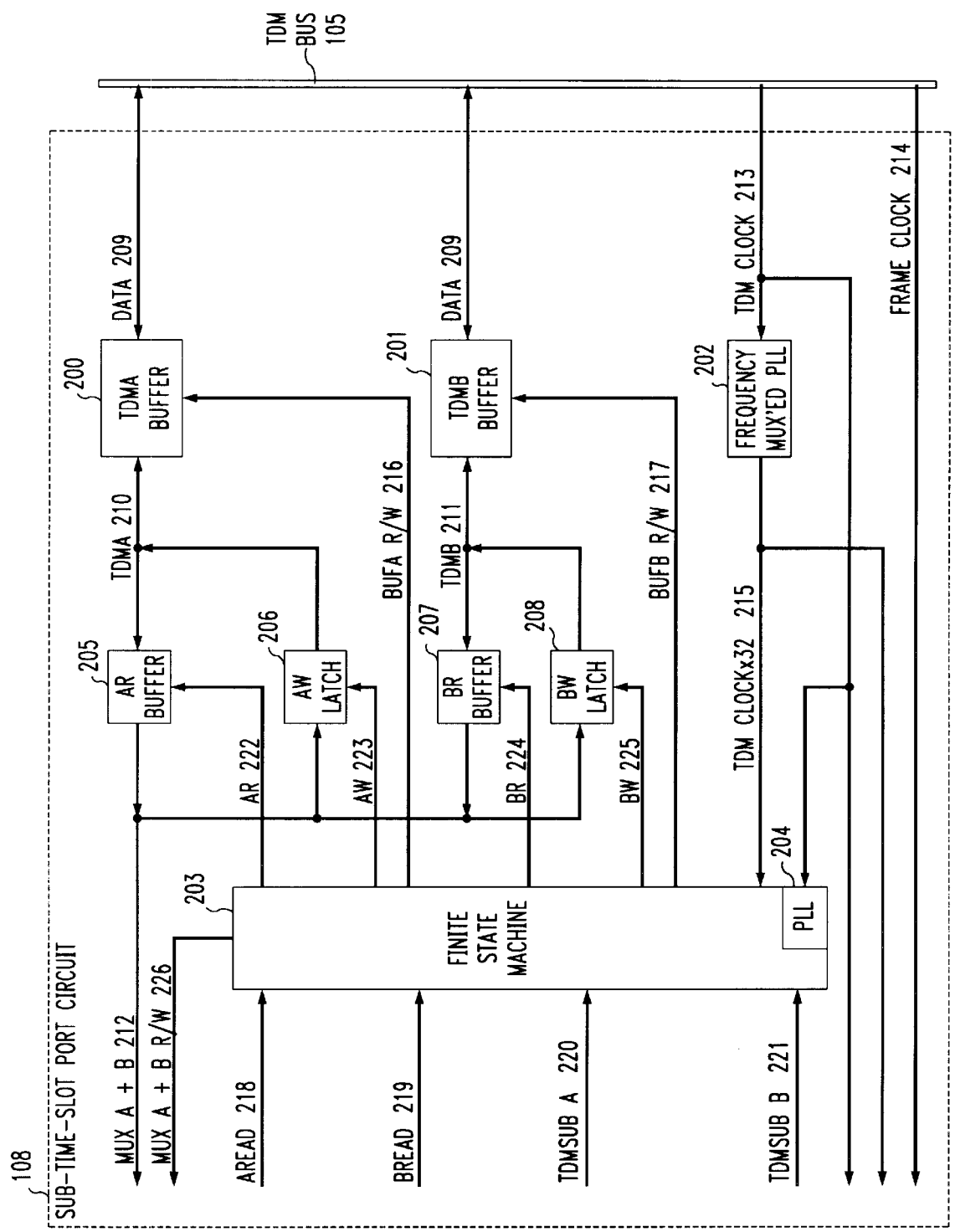
FIG. 2 is a block diagram of an illustrative embodiment of a portion of a sub-time-slot port circuit of the system of FIG. 1 that is constructed according to the invention.

In a sub-time-slot port circuit 108, the SCOTCH and the concentration highways of a conventional port circuit 106 are replaced by the circuitry shown in FIG. 2. Port circuit 108 is connected to data lines 209 of TDM bus by a TDMA buffer 200 and a TDMB buffer 201. Buffers 200 and 201 transmit/receive bytes of data and control information to/from time slots of TDM bus 105. In the Definity PBX, TDMA buffer 200 connects to the data lines of one of the two buses that make up TDM bus 105, and TDMB buffer 201 connects to data lines of the other of the two buses that make up TDM bus 105. Inside circuit 108, buffers 200 and 201 respectively connect to a pair of buses TDMA 210 and TDMB 211, on which they transmit bytes received from TDM bus 105 and from which they receive bytes for transmission on TDM bus 105. Buses 210 and 211 are respectively interfaced to a MUX A+B bus 212 by a TDMA read (AR) buffer 205 and a TDMA write (AW) latch 206, and by a TDMB read (BR) buffer 207 and a TDMB write (BW) latch 208. AR buffer 205 permits information from TDMA bus 210 to be read by MUX A+B bus 212, while AW latch 206 permits information from MUX A+B bus 212 to be written onto TDMA bus 210. Similarly, BR buffer 207 permits information from TDMB bus 211 to be read by MUX A+B bus 212, while BW latch 208 permits information from MUX A+B bus 212 to be written onto TDMB bus 211. Together, elements 205–208 function as a multiplexer/demultiplexer between bus 212 and buses 210-211. MUX A+B bus 212 conveys data and control information to and from other (e.g., conventional) circuits of port circuit 108.

A TDM CLK line 213 and a FRAME CLK line 214 of TDM bus 105 are also connected to circuit 108. TDM CLK line 213 distributes through switching system 100 clock signals that time full time slots on TDM bus 105. These are illustratively 2.048 MHz signals. FRAME CLK line 214 distributes clock signals that time frames of time slots on TDM bus 105. These are illustratively 8 KHz signals. TDM CLK line 213 is connected to a conventional frequency-multiplexed PLL 202 that frequency-multiplies the TDM time-slot clock signals by 32 (e.g., to 65.536 MHz) and synchronizes the multiplied signals with the TDM time-slot clock signals. PLL 202 outputs the multiplied clock signals on a TDM CLK×32 line 215.

Clock signal lines 213 and 215 are connected to a finite-state machine 203 as well as to other circuitry of port circuit 108. State machine 203 is a circuit that uses the clock signals received over lines 213 and 215 to generate sub-time-slot control signals for controlling the operation of port circuit 108. Besides the clock signals, state machine 203 takes as inputs an AREAD signal line 218 and a BREAD signal line 219 via which it receives instructions from other circuits of port circuit 108 regarding whether to read or write TDMA bus 210 and TDMB bus 211, respectively. State machine 203 further takes as inputs a TDM SUBA signal line 220 and a TDM SUBB signal line 221 via which it receives instructions from other circuits of port circuit 108 regarding whether to engage in conventional time-slot operation or sub-time-slot operation on portions A and B, respectively, of TDM bus 105. State machine 203 is illustratively implemented in a programmable-logic array (PLA). State machine 203 implements the 32 states and their corresponding control signals that are shown in FIG. 3.

Figure 4:
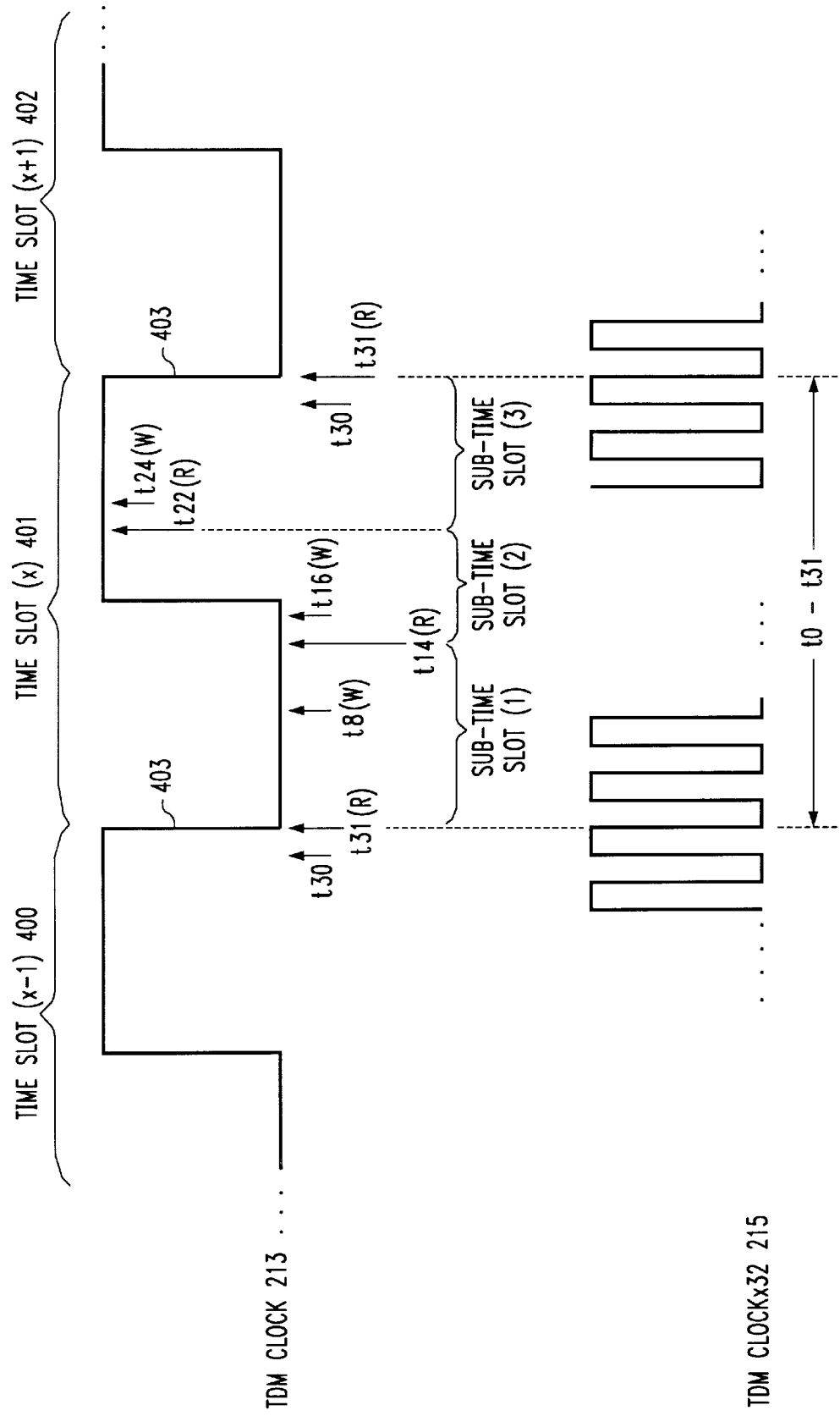
FIG. 4 is a timing diagram of operations of the port circuit of FIG. 2.

As shown in FIG. 4, each conventional time slot 400–402 on TDM bus 105 is defined by one full cycle of the clock signal on TDM CLK line 213 and ends on the falling edge 403 of that clock signal. State machine 203 is synchronized to the falling edge 403 of time-slot clock signals by a digital PLL 204. Digital PLL 204 is advantageously implemented as the last two states 30 and 31 of state machine 203. State machine 203 starts out in state 30 of FIG. 3, wherein it monitors TDM CLK signal line 213 for the falling edge 403 of a time-slot clock signal. The time-slot clock-signal falling edge 403 that occurs at a time t(31) in FIG. 4 signals the end of a time slot, and state machine 203 goes to state 31 of FIG. 3 where it issues "read" signals on BUFA RIW and BUFB RIW control lines 222 and 223 of FIG. 2, to cause TDMA buffer 200 and TDMB buffer 201 to read a byte of information (data or control) from TDM bus 105. (This is the time at which a conventional port circuit 106 would read a time slot of TDM bus 105.)

The next tick of the multiplied clock signal on TDM CLK×32 line 215 signals the beginning of a new time slot 400–402, and state machine 203 goes to state 0 of FIG. 3. In state 0, if AREAD input-signal line 218 to state machine 203 is in a "read" state, indicating that TDMA bus 210 is to be read, state machine 203 issues a "read" signal on AR control line 222 to cause AR buffer 205 to output its contents on MUX A+B bus 212. State machine 203 then maintains the "read" signal on AR line 222 for the next three states to give devices attached to MUX A+B bus 212 sufficient time to read bus 212. At the next tick of the multiplied clock signal, state machine 203 goes to state 1. In state 1, if AREAD line 218 is in a "write" state, state machine 203 issues a "write" signal on MUX A+B RIW control line 226 to cause a device (e.g., a DSP, not shown) of port circuit 108 that is connected MUX A+B bus 212 to write bus 212. At the next tick of the multiplied clock signal on TDM CLK×32 line 215, state machine 203 goes to state 2. In state 2, if AREAD line 218 is in the "read" state, state machine 203 issues a "read" signal on MUX A+B R/W line 226 to cause a device of port circuit 108 that is connected to MUX A+B bus 212 to read bus 212. At the next tick of the multiplied clock signal, state machine 203 goes to state 3. In state 3, if AREAD line 218 is in the "write" state, state machine 203 issues a "write" signal on AW line 223 to cause AW latch 206 to latch data from MUX A+B bus 212. At the next tick of the multiplied clock signal, state machine 203 goes to state 4. In state 4, if BREAD input-signal line 219 to state machine 203 is in a "read" state, state machine 203 issues a "read" signal on BR control line 224 to cause BR buffer 207 to output its contents on MUX A+B bus 212. State machine 203 then maintains the "read" signal on BR line 224 for the next three states. At the next tick of the multiplied clock signal, state machine 203 goes to state 5. In state 5, if BREAD line 219 is in a "write" state, state machine 203 issues a "write" signal on MUX A+B R/W line 226 to cause a device of port circuit 108 that is connected to MUX A+B bus 212 to read bus 212. At the next tick of the multiplied clock signal, state machine 203 goes to state 6. In state 6, if BREAD line 219 is in a "read" state, state machine 203 issues a "read" signal on MUX A+B R/W line 226 to cause a device of port circuit 108 that is connected to MUX A+B bus 212 to read bus 212. At the next tick of the multiplied clock signal, state machine 203 goes to state 7. In state 7, if BREAD line 219 is in the "write" state, state machine 203 issues a "write" signal on BW control line 225 to cause BW latch 208 to latch data from MUX A+B bus 212. At the next tick of the multiplied clock signal, state machine 203 goes to state 8. In state 8, if AREAD line 218 is in a "read" state, state machine 203 issues a "read" signal on AR line 222 to cause AR buffer 205 to output its contents on MUX A+B bus 212. State machine 203 then maintains the "read" signal on AR line 223 for the next three states. Also in state 8, if AREAD line 218 or BREAD line 219 is in the "write" state, state machine 203 issues "write" signals on BUFA R/W line 216 and BUFB R/W line 217 to cause buffers 200 and 201 to write their contents onto TDM bus 105. (This is approximately the time at which a conventional port circuit 106 would write a time slot of TDM bus 105.) At the next six ticks of the multiplied clock signal, state machine 203 goes through states 9–14 where it repeats the activities of states 1–6, respectively. Additionally in state 14, state machine 203 also issues "read" signals on BUFA R/W line 216 and BUFB R/W line 217 to cause TDMA and TDMB buffers 200 and 201 to read data from TDM bus 105. The first sub-time-slot of a TDM bus 105 time slot ends at this point, and a second sub-time-slot begins, as shown in FIG. 4.

The operations of states 15–30 shown in FIG. 3 are performed only if TDM SUBA and TDM SUBB input-signal lines 220 and 221 indicate that port circuit 108 is to engage in sub-time-slot operation; otherwise, those states result in "no-ops" by state machine 203. At the next tick of the multiplied clock signal, state machine 203 goes to state 15. In state 15, if TDM SUBB input-signal line 221 to state machine 203 is in a "yes" state, indicating that sub-time-slot operation is to be effected on part B of TDM bus 105, and BREAD line 219 is in the "write" state, indicating that TDMB bus 211 is to be written, state machine 203 issues a "write" signal on BW line 225 to cause BW latch 208 to latch data from MUX A+B bus 212. At the next tick of the multiplied clock signal, state machine 203 goes to state 16. In state 16, if TDM SUBA input-signal line 220 to state machine 203 is in a "yes" state, indicating that sub-time-slot operation is to be effected on part A of TDM bus 105, and AREAD line 219 is in the "read" state, indicating that TDMA bus 210 is to be read, state machine 203 issues a "read" signal on AR line 222 to cause AR buffer 205 to output its contents on MUX A+B bus 212. State machine 203 then maintains the "read" signal on AR line 222 for the next three states. Also in state 16, if TDM SUBA line 220 or TDM SUBB line 221—or both—is in the "yes" state and also the corresponding AREAD line 218 or BREAD line 219—or both—is in the "write" state, state machine 203 issues a "write" signal respectively on BUFA R/W line 216 or BUFB R/W line 217—or on both—to cause the respective TDMA buffer 200 or TDMB buffer 201—or both—to write their contents onto TDM bus 105. At the next three ticks of the multiplied clock signal, state machine 203 goes through states 17–19 where it duplicates the activities of states 1–3, respectively, if the TDM SUBA line 220 is in the "yes" state. At the next two ticks of the multiplied clock signal, state machine 203 goes through states 20–21 where it duplicates the activities of states 4–5, respectively, if TDM SUBB line 221 is in the "yes" state. At the next tick of the multiplied clock signal, state machine 203 goes to state 22. In state 22, if TDM SUBB line 221 is in the "yes" state and BREAD line 219 is in the "read" state, state machine 203 issues a "read" signal on MUX A+B RIW line 226 to cause a device of port circuit 108 that is connected to MUX A+B bus 212 to read bus 212. Also in state 22, if TDM SUBA line 220 or TDM SUBB line 221—or both—is in the "yes" state and also the corresponding AREAD line 218 or BREAD line 219—or both—is in the "read" state, state machine 203 issues a "read" signal respectively on BUFA RIW line 216 or BUFB R/W line 217—or on both—to cause the respective TDMA buffer 200 or TDMB buffer 201—or both—to read data from TDM bus 105. At this point, the second sub-time-slot of a TDM bus 105 time slot comes to an end and a third sub-time-slot begins, as shown in FIG. 3.

In the next seven ticks of the multiplied clock signal, state machine 203 goes through states 23–29 where it duplicates the activities of states 15–21, respectively. At the next tick of the multiplied clock signal, state machine 203 goes to state 30. In state 30, if TDM SUBB line 221 is in the "yes" state and BREAD line 219 is in the "read" state, state machine issues a "read" signal on MUX A+B R/W line 226 to cause a device of port circuit 108 that is connected to MUX A+B bus 212 to read bus 212. State machine 203 remains in state 30 until it detects a low level, which indicates that the falling edge 403 of a time-slot clock signal has occurred. At that point—which normally occurs substantially at the next tick of the multiplied clock signal—state machine 203 goes to state 31. In state 31, state machine 203 issues "read" commands on BUFA R/W line 216 and BUFB R/W line 217 to cause buffers 200 and 201 to read and store data from TDM bus 105. At this point, both the TDM bus 105 time slot as well as the third sub-time-slot come to an end, and a new TDM bus 105 time slot and its first sub-time-slot begin, as shown in FIG. 3.

As shown and described above, port circuit 108 is selectively enabled to perform either a conventional single transfer via TDM bus 105 in a TDM bus time slot or three transfers, i.e., three sub-time-slot operations, in the timespan of a single TDM bus 105 time slot. Hence, port circuit 108 can engage in communications either with conventional port circuits 106 via the former transfers, or with other sub-time-slot port circuits 108 via the latter transfers. The latter transfers triple the normal transfer capacity of TDM bus 105. As a consequence, conventional and sub-time-slot port circuits 106 and 108 can be "mixed-and-matched" in the same switching system 100, making retrofit into existing switching systems possible and easy to do. Yet no modifications to the conventional switching systems are required.

Of course, various changes and modifications to the illustrative embodiment described above will be apparent to those skilled in the art. For example, TDM bus 105 may be interfaced directly to bus 212 by buffers 200 and 201. Also, TDM bus 105 need not be a dual bus but may be a single bus, or alternatively, bus 212 need not be multiplexed. Or the number of sub-time slots within a time slot can be any desired number. Furthermore, there may be a plurality of "talkers" and/or "listeners" on a subdivided time slot, e.g., different devices can transmit and/or receive on different sub-time-slots of a single time slot. Such changes and modifications can be made without departing from the spirit and the scope of the invention and without diminishing its attendant advantages. It is therefore intended that such changes and modifications be covered by the following claims.

The invention claimed is:

1. A switching system comprising:
   a time-division multiplexed switching fabric defining a plurality of time slots each having a predetermined duration;
   a plurality of first port circuits connected to the switching fabric, each for only effecting only one information transfer through the switching fabric during any time slot; and
   a plurality of second port circuits connected to the switching fabric, each defining a plurality of sub-time slots during each said time slot, for selectively effecting either one of both (a) only one information transfer through the switching fabric during any time slot with a first port circuit and (b) one information transfer through the switching fabric during any one sub-time slot so as to effect a plurality of information transfers through the switching fabric during a single time slot with another second port circuit.

2. The switching system of claim 1 wherein:
   each second port circuit effects only one information transfer through the switching fabric during one time slot with a first port circuit, and effects one information transfer through the switching fabric during one sub-time slot with another second port circuit.

3. The switching system of claim 1 wherein:
   the switching fabric includes
      a signaling link for conveying to port circuits first clock signals defining the time slots; and
   each second port circuit includes
      an arrangement connected to the signaling link for multiplying received said first clock signals to generate from the first clock signals second clock signals defining the sub-time slots.

4. The switching system of claim 1 wherein:
   each second port circuit includes
   an arrangement for synchronizing the plurality of sub-time slots with a time slot.

5. The switching system of claim 1 wherein:
   each second port circuit includes
      a finite-state machine for generating control signals for the second port circuit that effect the one information transfer through the switching fabric during said any one sub-time slot.

6. The switching system of claim 5 wherein:
   the finite-state machine further effects synchronizing the plurality of sub-time slots with a time slot.

7. A port circuit for a switching system having a time-division multiplexed switching fabric defining a plurality of time slots each having a predetermined duration and a plurality of first port circuits connected to the switching fabric, each for only effecting only one information transfer through the switching fabric during any time slot, the port circuit comprising:
   an arrangement for defining a plurality of sub-time slots during each time slot; and
   an arrangement coupled to the sub-time-slot defining arrangement for selectively effecting either one of both (a) only one information transfer through the switching fabric during any time slot with a first port circuit and (b) one information transfer through the switching fabric during any one sub-time slot so as to effect a plurality of information transfers through the switching fabric during a single time slot with another second port circuit.

8. The port circuit of claim 7 wherein:
   the transfer-effecting arrangement is for effecting only one information transfer through the switching fabric during one time slot with a first port circuit, and for effecting one information transfer through the switching fabric during one sub-time slot with another port circuit that also comprises a sub-time-slot defining arrangement and a transfer-effecting arrangement.

9. The port circuit of claim 7 for a switching system that further conveys first clock signals defining the time slots to all port circuits, wherein:
   the sub-time-slot defining arrangement comprises
   an arrangement for multiplying received said first clock signals to generate from the first clock signals second clock signals defining the sub-time slots.

10. The port circuit of claim 7 wherein:
    the sub-time-slot defining arrangement includes
    an arrangement for synchronizing the plurality of sub-time slots with a time slot.

11. The port circuit of claim 7 wherein:
    the transfer-effecting arrangement comprises
       a finite-state machine for generating control signals for the port circuit that effect the one information transfer through the switching fabric during said any one sub-time slot.

12. The port circuit of claim 11 wherein:
    the finite-state machine effects synchronizing the plurality of sub-time slots with a time slot.

* * * * *